United States Patent [19]

Tice et al.

[11] Patent Number: 5,254,877
[45] Date of Patent: Oct. 19, 1993

[54] DISTRIBUTED POWER SUPPLY SYSTEM

[75] Inventors: Lee D. Tice, Bartlett; Jia Pang, West Chicago; Robert J. Clow, North Aurora, all of Ill.

[73] Assignee: Pittway Corporation, Chicago, Ill.

[21] Appl. No.: 866,138

[22] Filed: Apr. 9, 1992

[51] Int. Cl.$^5$ .............................................. H02J 9/00
[52] U.S. Cl. .......................................... 307/66; 363/71
[58] Field of Search .................. 340/693, 333; 375/36; 307/64, 65, 66; 363/71

[56] References Cited

U.S. PATENT DOCUMENTS

| | | | |
|---|---|---|---|
| 3,921,005 | 11/1975 | Watrous | 307/64 |
| 4,225,792 | 9/1980 | Fahey | 307/64 |
| 4,507,652 | 3/1985 | Vogt et al. | 340/501 |
| 4,578,541 | 3/1986 | Dodds | 179/18 |
| 4,916,432 | 4/1990 | Tice et al. | 340/518 |
| 4,956,563 | 9/1990 | Schornack | 307/66 |
| 4,995,054 | 2/1991 | Ecekrsley | 375/36 |
| 5,015,870 | 5/1991 | Drobny et al. | 307/66 |
| 5,172,096 | 12/1992 | Tice et al. | 340/501 |

Primary Examiner—Steven L. Stephan
Assistant Examiner—Adolf Berhane
Attorney, Agent, or Firm—Dressler, Goldsmith, Shore, Sutker & Milnamow, Ltd.

[57] ABSTRACT

One or more supplemental, pulsed energy sources can be used in combination with a pulsed, primary energy source which provides energy to a plurality of spaced apart loads. The loads are coupled to the pulsed, primary source by a pair of conductors. Each supplemental energy source includes circuitry for repetitively storing a predetermined quantity of supplemental energy and circuitry for detecting a start of a primary energy pulse and in response thereto, for discharging the restored supplemental energy into the conductors. Between primary energy pulses, the supplemental energy quantity is automatically restored.

14 Claims, 3 Drawing Sheets

DISTRIBUTED POWER SUPPLY SYSTEM

FIELD OF THE INVENTION

The invention pertains to distributed power supply electrical systems. More particularly, the invention pertains to supplemental power supplies which can inject electrical energy into a pair of conductors during selected time intervals.

BACKGROUND OF THE INVENTION

Distributed unit detector systems are well known. One such system is disclosed in U.S. Pat. No. 4,916,432, entitled "Smoke And Fire Detection System Communication", assigned to the assignee of the present invention.

Such systems include a plurality of spaced apart detectors which are linked by elongated, two conductor signaling cable to a control panel. The signaling cable may be long, having lengths of the order of thousands of feet. In addition, it may be desirable or necessary to connect several hundred detectors to each two conductor cable.

The detectors are conventionally coupled in parallel across the two conductors which make up the cable. Each of the detectors includes a plurality of electrical or electronic elements and energy must be supplied thereto.

One known way in which energy is supplied to such systems is to inject pulses of electrical energy into the signaling conductors at the control panel. This approach has the advantage that separate power wiring is not needed for the detectors. The only cable which needs to be run is the two wire signaling cable across which each of the detectors is coupled.

Since the primary function of the conductive cable is to provide a signaling path between the detector and the control panel, relatively small gage wire can be used. Such wire is inexpensive and it can readily be run for hundreds of feet throughout building ceiling spaces. However, such wire is not suitable for distributing substantial quantities of electrical energy.

Where number 22 or 24 twisted pair wire is used, for example, as the conductive signaling cable, it becomes very difficult to inject enough electrical energy at the control panel end of the cable, assuming it is several thousand feet long, for the purpose of powering several hundred spaced apart detectors, coupled thereto. Resistive, capacitive, and inductive losses in the twisted pair cable will reduce the voltage from the panel available at the distal end of the cable. As a result, only a small part of the electrical energy injected into the cable at the panel will be available to energize detectors at the distal end of the cable.

If the voltage at the distal end of the two-conductor cable falls too far, there will be insufficient energy to power those detectors which are located at great distances from the control panel. The problem is exacerbated if the detectors include lightable displays to provide local indicia of status or alarm conditions.

Earlier solutions to this problem have not been satisfactory. One solution has been to use larger gage wire. This increases the cost and difficulty of system installation.

Another unsatisfactory solution has been to limit the number of devices on a given two wire conductor.

Another unsatisfactory solution has been to use shorter cable lengths.

A further unsatisfactory solution has been to interpose a repeater unit between the control panel and the distal end of the cable. The repeater unit serves as a power amplifier and provides, in addition to additional power, bidirectional communication between the control panel and the distal end of the cable.

As noted previously, none of the known prior solutions to this problem have been satisfactory. There continues to be a need for a cost effective and an easy to install apparatus which can be used with long, 22 and 24 gage twisted pair conductors to which several hundred spaced apart detector units might be coupled.

A preferred apparatus will be easily connected to the conductors without any provision for special junction boxes. Also, preferably, such an apparatus will be relatively inexpensive. In addition, it will be able to deliver substantial amounts of energy to the cable at locations displaced from the proximal, control panel end.

SUMMARY OF THE INVENTION

A source of electrical energy is provided which is usable with first and second conductors to inject quantities of electrical energy therein. The conductors have a proximal end and a distal end.

Quantities of electrical energy, spaced apart in time, are injected into the proximal end of the conductors. The quantities of electrical energy are intended to actuate a plurality of electrical loads, spaced apart along the conductors.

The apparatus includes a circuit for storing a predetermined quantity of electrical energy. This circuit can include a storage capacitor.

Further circuitry is coupled to the storage circuit and is in turn couplable to the conductors for detecting a predetermined portion of pulses of electrical energy injected at the proximal end of the conductors. Finally, circuitry responsive to the detecting circuitry is provided for discharging the quantity of energy stored into the conductors within a preset time interval.

Where electrical energy is injected into the panel end of the conductors in the form of pulses of current or voltage, the detecting circuitry can include a synchronizer to sense a voltage or current change in the injected pulse or pulses. The sensed change can be used for synchronizing and discharging the stored quantity of electrical energy with the pulses applied to the panel end.

The synchronizer can include threshold circuitry with a zener diode in combination with a semiconductor switch. The discharging time period can be established by means of a further zener diode and semiconductor switch.

The storage capacitor, which is regularly recharged from another power source, can be discharged by yet another semiconductor switch. The size of the selected capacitor determines the quantity of energy stored thereon.

A plurality of the supplemental sources can be coupled to the two conductor communication cable, spaced apart from one another, and from the proximal end control panel. If desired, inductive energy storage devices can be used as an alternate to capacitors.

A method of supplementing available electric energy along an elongated conductor having a proximal end, primary, energy input port includes the steps of repetitively injecting, at selected time intervals predetermined primary quantities of electrical energy at the proximal end input port. Sensing at one or more locations along the conductor, the beginnings of at least some of the injecting steps.

In response to the sensed injecting steps, injecting supplemental amounts of electrical energy into the conductor at one or more spaced apart locations. The supplemental amounts of energy are injected at the one or more locations during a common, predetermined, time interval.

These and other aspects and attributes of the present invention will become increasingly clear upon reference to the following drawings and accompanying specifications.

DETAILED DESCRIPTION OF THE PREFERRED EMBODIMENT

Figure 1:
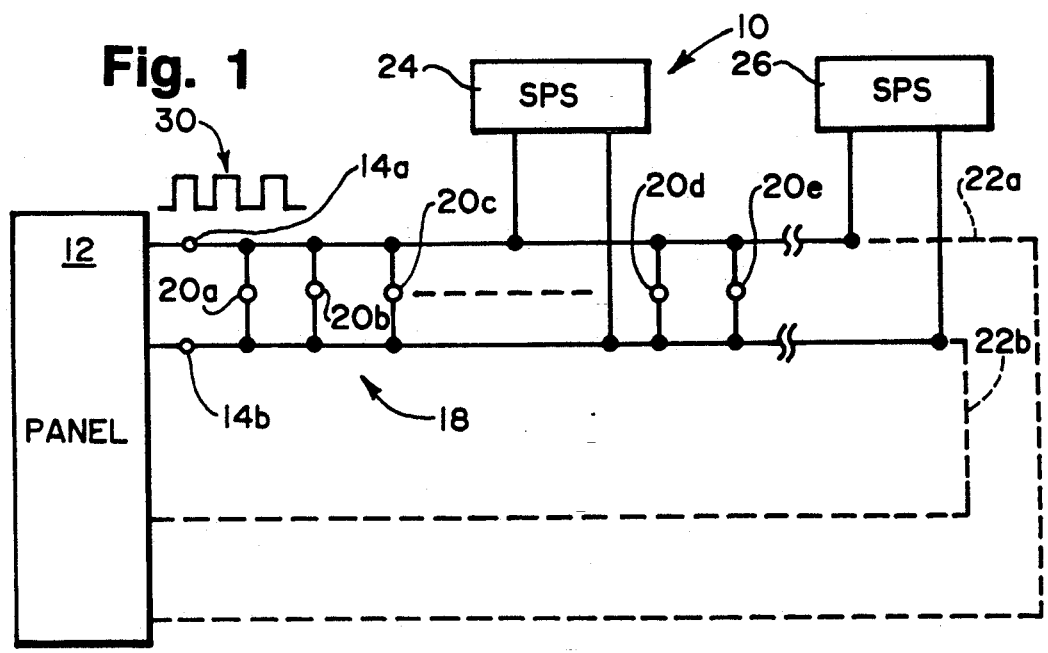
FIG. 1 is an overall schematic diagram of a multidetector system usable with the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 illustrates a system 10, which could be a distributed detector fire alarm system. The system 10 includes a conventional control panel 12 which is coupled via first and second conducting members 14a, 14b to a plurality of distributed units 18.

The plurality of units 18 could include smoke detectors 20a-20c illustrated symbolically in FIG. 1. The plurality 18 could also include other types of units such as intrusion detectors 20d, 20e, or any other types of units that may be desirable.

The conductors 14a, 14b can be a two conductor cable in the form of a twisted pair. Typical sizes for the conductors 14a, 14b are in a range of 20-22 gauge wire.

The length of the conductors 14a and 14b can be several thousand feet and the plurality of units 18 can include two hundred or more units. If desired, the distal ends 22a, 22b of the conductors 14a, 14b can be looped back to the panel 12 to provide a redundant signal path.

As is conventional with systems having a plurality of distributed units, such as the plurality 18, the panel 12 is used as a source of electrical energy for the units. The panel 12 repetitively pulses the conductors 14a, 14b for purposes of communication with one or more of the members of the plurality 18. In addition, during selected periods of the pulse waveform 30, conventionally when the pulses exceed a predetermined amplitude, the panel 12 provides electrical energy to the plurality 18. Hence, separate power lines are not needed for the members of the plurality 18.

Each of the members of the plurality 18 includes an energy storage device, such as a capacitor, which is charged up during the time period when the pulses 30 from the panel 12 exceed a predetermined amplitude. The stored energy can then be used to power the unit during intervening time intervals.

The system 10 also incorporates first and second supplemental power supplies 24, 26. The supplemental power supplies 24, 26 are coupled to the conductors 14a, 14b spaced apart from the panel 12.

The supplemental power supplies inject electrical energy into the system 10, synchronized with the pulses from the panel 12, but at distributed locations along the conductors 14a, 14b. The purpose of the supplemental power supplies 24, 26 is to compensate for losses in the lines 14a, 14b.

Each of the supplemental power supplies 24, 26 is identical in structure. One or more of such units may be used in a given installation depending on the number of detectors in the plurality 18.

Figure 2:
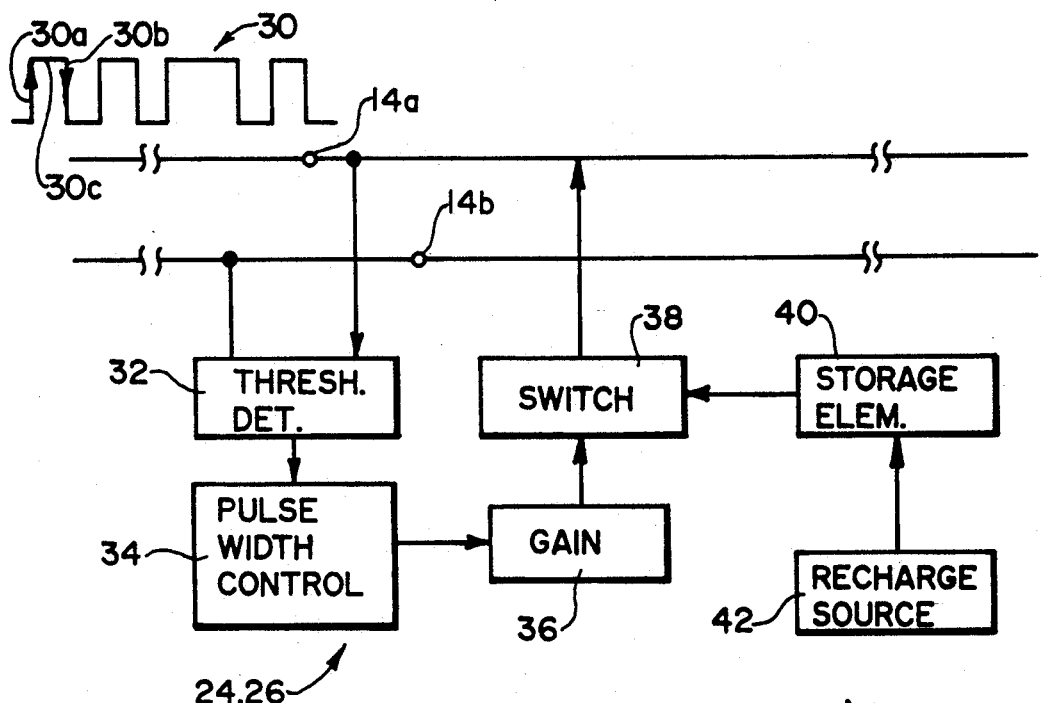
FIG. 2 is an overall block diagram of a supplemental source of electrical energy in accordance with the present invention.

FIG. 2 is representative block diagram of the supplemental power supply 24 or 26. Each supplemental power supply includes threshold detection circuitry 32 for the purpose of determining when the amplitude of one or more pulses 30 on the lines 14a, 14b has exceeded a predetermined threshold.

Coupled to the threshold detector 32 is a pulse width control circuit 34. The pulse width control circuit 34 adjusts the time interval during which energy is injected into the system 10 by the supplemental supplies 24, 26.

Coupled to the pulse width control circuitry 34 is a gain or amplification circuit 36. The gain or amplification circuit 36 in turn is coupled to, and controls, a semiconductor switch 38. The switch 38 is in turn coupled to the conductors 14a, 14b. In addition, the switch 38 is coupled to a storage element 40.

The storage element 40 could be a capacitor. Alternately, it can be an inductor. The storage element 40 is recharged periodically from a source 42.

When the threshold detector 32 senses that a pulse 30 on the lines 14a, 14b has an amplitude which exceeds a predetermined threshold, the pulse width control circuitry 34 in combination with the gain circuitry 36 causes switch 38 to conduct thereby discharging storage element 40 into the lines 14a, 14b. The storage element 40 is discharged during a time interval set by the pulse width control circuity 34. Subsequently, the recharging circuitry 42 recharges the storage element 40.

The threshold detector 32 can be set to detect a positive going edge 30a of the pulse 30. Subsequently, the storage element 40 can be discharged into the lines 14a, 14b.

After the discharge period set by the pulse width control circuitry 34, information can be transferred by a falling edge 30b to the members of the plurality 18. Hence, any electrical noise generated by the supplemental power supplies 24, 26 during the discharge time interval will not be present during the period of time starting with the falling pulse transition 30b during which information is transferred to or from the plurality of units 18.

Figure 3:
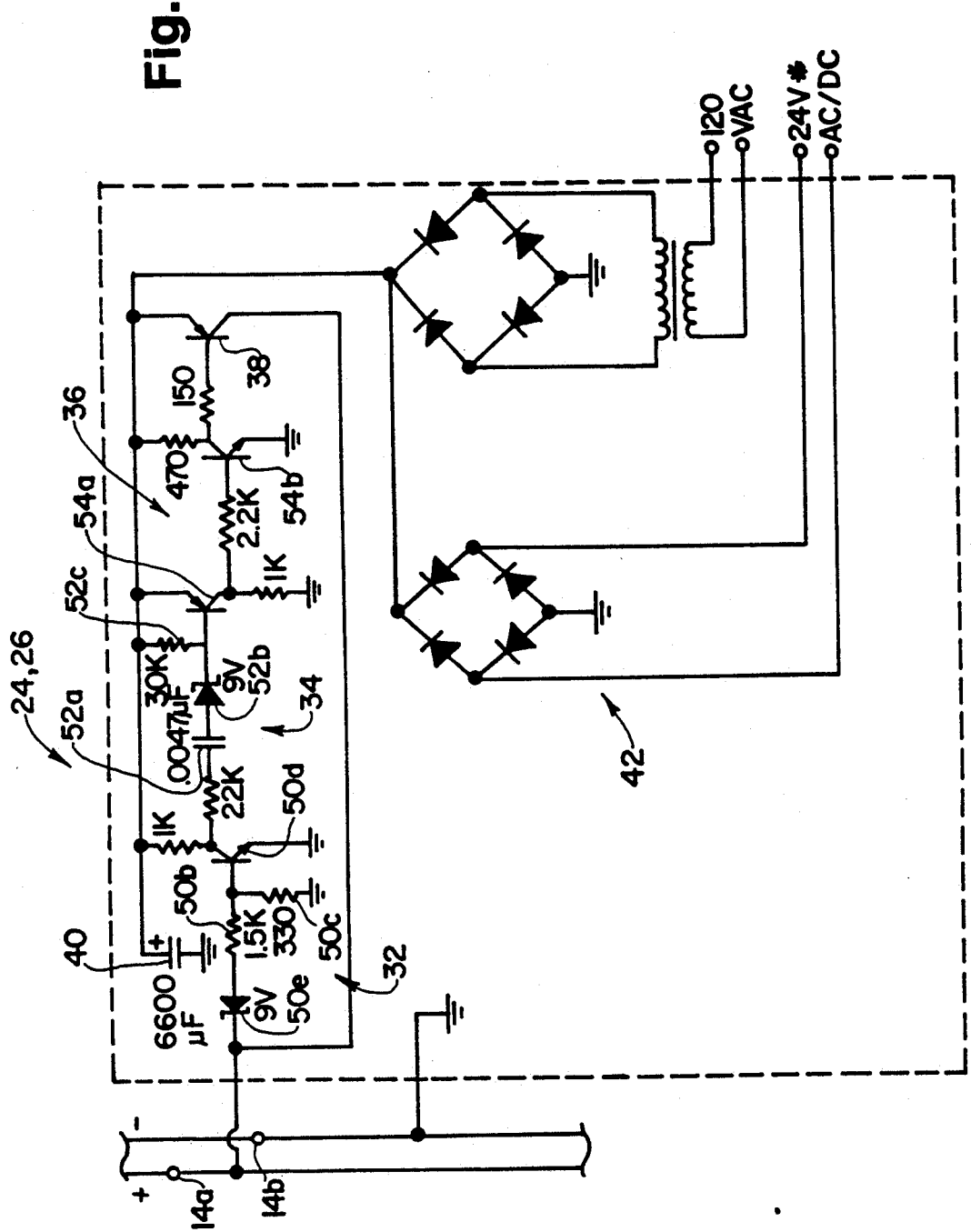
FIG. 3 is a detailed schematic diagram of an exemplary supplemental source of electrical energy in accordance with the present invention.

FIG. 3 is a detailed schematic diagram of the charge pump 24 or 26. The threshold detector 32 includes a zener diode 50a coupled to voltage divider resistors 50b, 50c. When the amplitude of the pulse 30 on the lines 14a, 14b exceeds approximately 12 volts, a switching transistor 50d is turned on.

Coupled to a collector of the transistor 50d is the pulse width control circuitry 34. The pulse width control circuitry 34 includes a capacitor 52a, a zener diode 52b, and a biasing resistor 52c.

When the transistor 52d turns on, gain transistors 54a, 54b are both turned on for the time interval set by the pulse width control circuitry 34. During the time interval that the transistors 54a, 54b are conducting, the switching transistor 38 is turned on and the electrical energy stored on energy storage device 40, a capacitor is discharged into the conductors 14a, 14b.

Subsequently, charging circuitry 42 recharges the capacitor 40 when the transistor 38 is turned off again. Preferably, the time interval established by the pulse width control circuitry 34 will be less than the pulse width 32c. For the exemplary values of FIG. 3, the discharge pulse width set by the circuit 34 is in the order of 200$\mu$ sec with a current amplitude of one amp.

Figure 4:
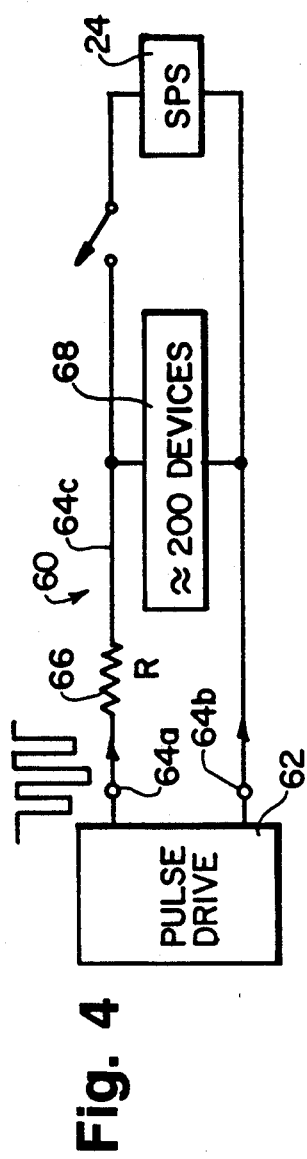
FIG. 4 is a schematic diagram of a test circuit usable with a supplemental source supply in accordance with the present invention.

FIG. 4 is a schematic of a test circuit 60. The circuit 60 includes pulse drive circuitry 62 of a type used with the panel 12 to drive lines such as conductors 14a, 14b.

In FIG. 4, the pulse drive circuitry 62 was set up to provide lines 64a, 64b with 19 volt pulses comparable to those used in distributed processor systems such as the system 10. To simulate long lines, a resistor 66 was placed in series in the line 64a.

For purposes of loading the test circuit 60, approximately 200 detector units 68 were coupled between the conductor 64c and the conductor 64b. Hence, the resistor 66 was positioned serially between the energy input by the circuitry 62 and the detectors 68.

The detectors 68 were arranged such that there were essentially zero Ohms present in the conductor regions 64c, 64b. A supplemental power supply 24 was coupled across the conductors 64b, 64c as illustrated in FIG. 4.

The pulse drive circuitry 62 was then energized. Pulses having an amplitude on the order of 19 volts were applied to the conductors 64a, 64b. The waveform at the unit was recorded between the conductors 64c, 64b without the supplemental power supply 24 being connected.

Figure 5:
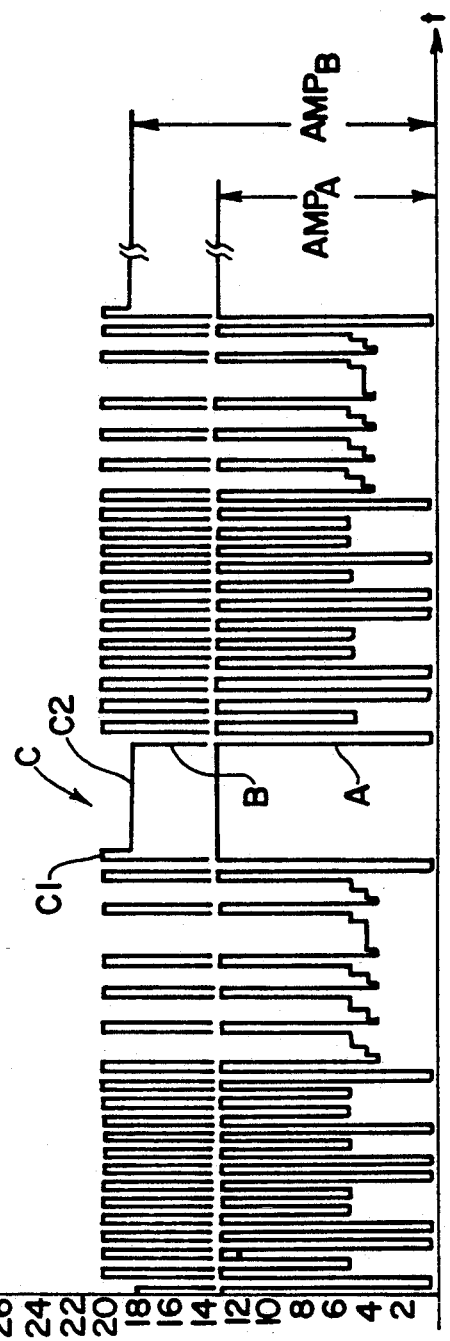
FIG. 5 is a graph illustrating test results of deliverable energy for the circuit of FIG. 4 with and without a supplemental source of energy in accordance with the present invention.

FIG. 5 illustrates, as waveform A, the voltage signal measured between the conductors or lines 64c and 64b while driving the 200 detectors. As illustrated in FIG. 5, the amplitude of the waveform A is on the order of only 13 volts. Thus, the resistor 66 and the load provided by the plurality of devices 68 reduces the amplitude of the voltage pulses between the lines 64c, 64b from an initial 19 volts to a maximum of about 13 volts.

The supplemental power supply 24 was then coupled across the lines 64c, 64b as illustrated in FIG. 4. Again, with respect to FIG. 5, the waveform on the lines 64c, 64b was recorded as waveform B.

As illustrated in FIG. 5, the pulses of the waveform B exhibit a maximum amplitude on the order of 20 volts. This increase in amplitude from about 13 volts to about 20 volts is attributable to the additional energy input by the supplemental power supply 24 and synchronized with the pulses input across the lines 64a, 64b by the pulse drive circuitry 62.

The effect of the supplemental power supply 24 is clearly illustrated in the region C of waveform B. The longer pulse width of the region C is provided to enable the members of the plurality 68 to fully recharge.

It should be noted that the region C of waveform B includes two parts. A first region C1 corresponds to the time interval when the supplemental power supply 24 is injecting additional energy into the lines 64c, 64b.

A second region C2 has an amplitude on the order of 18 volts which is very comparable to the input amplitude of 19 volts provided by the pulse input circuitry 62. The region C2 illustrates that the members of the plurality of devices 68 are all charged to the panel voltage amplitude. Thus, there is essentially no current flowing through the resistor 66.

The use of the supplemental power supply 24 in the test circuitry 60 illustrates that substantial quantities of energy can be injected into the lines 64c, 64b. Thus, performance of distributed detector systems, such as the system 10, can be substantially improved. As a result of using supplemental power supplies, such as the supply 24, the system 10 will now be able to tolerate more loading due to larger numbers of detectors in the plurality 18, than is the case without one or more of the supplemental power supplies 24, 26.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:

1. A source of electrical energy usable with first and second conductors which carry an impressed electrical signal, the source comprising:
    circuitry for storing a predetermined quantity of electrical energy;
    circuitry, coupled to said storing circuitry and couplable to the conductors, for detecting a predetermined portion of the impressed electrical signal; and
    circuitry, responsive to the detecting circuitry, for discharging said stored quantity of energy into the conductors within a predetermined time period in the presence of the impressed electrical signal.

2. A source as in claim 1 wherein the impressed electrical signal is a time varying signal which carries electrical energy for a load during a first time interval and carries information during another time interval and wherein said detecting circuitry includes circuitry for enabling said discharging circuitry to discharge said stored energy only during said first time interval.

3. A source as in claim 1 which includes pulse width determining circuitry, coupled to said discharging circuitry, for defining the predetermined time interval wherein said stored energy quantity is discharged into the conductors.

4. A source as in claim 1 including gain circuitry coupled between said detecting and said discharging circuitry.

5. A charge pump, usable with a pair of conductors which are pulsed from a primary energy source, comprising:
    an energy storage device;
    circuitry for repetitively storing a predetermined quantity of energy in said storage device;
    sensing circuitry for detecting when the pulses on the conductors cross a predetermined threshold value; and
    switching circuitry, coupled between said storage device and said sensing circuitry, and responsive thereto, for transferring said stored quantity of energy to the conductors in the presence of the pulses, when the pulses cross said threshold value.

6. A charge pump as in claim 5 wherein said storage device includes a capacitor.

7. A charge pump as in claim 5 with said sensing circuitry including a threshold establishing element.

8. A charge pump as in claim 5 including a gain element.

9. A charge pump as in claim 5 including circuitry for comparing an amplitude parameter of the pulses to a predetermined threshold.

10. A multiple detector security system comprising:
a power supply for delivering pulsed electrical energy to an output port;
at least a first electrical conductor coupled to said output port;
a plurality of detectors wherein each said detector is coupled to said conductor; and
a first, supplemental, pulsed energy source coupled to said conductor, displaced from said supply, with said supplemental source including circuitry for injecting pulses of supplemental energy into said conductor in the presence of said pulsed electrical energy.

11. A system as in claim 10 including a second, supplemental, pulsed energy source, substantially identical to said first source and coupled to said conductor, displaced from both said power supply, and said first supplemental source.

12. A system as in claim 10 which includes a second conductor and wherein said supplemental source is coupled to both of said conductors.

13. A method of supplementing available electrical energy along an elongated conductor having a primary energy input port, the method comprising the steps of:
repetitively injecting, at selected time intervals, predetermined, primary quantities of electrical energy into the primary energy input port; and
sensing, at one or more locations along the conductor, the beginnings of at least some of the injecting steps and in response thereto, injecting supplemental amounts of electrical energy into the conductor at the respective one or more locations in the presence of injected primary quantities of energy.

14. A method as in claim 13 wherein the supplemental amounts of energy are injected at the one or more locations during a common, predetermined, time period.

* * * * *